US005423512A

United States Patent [19]

[11] Patent Number: 5,423,512

Ushio et al.

[45] Date of Patent: Jun. 13, 1995

[54] MIRROR SMUDGE DETECTING APPARATUS FOR AN IMAGE FORMING APPARATUS

[75] Inventors: Masaru Ushio; Junji Sato; Kazuhisa Maruyama; Kazuhiro Nakazawa, all of Hachioji, Japan

[73] Assignee: Konica Corporation, Japan

[21] Appl. No.: 114,316

[22] Filed: Aug. 30, 1993

[30] Foreign Application Priority Data

Sep. 8, 1992 [JP] Japan ............ 4-239841

[51] Int. Cl.[6] ............ G01J 1/32

[52] U.S. Cl. ............ 250/205; 250/214 AG

[58] Field of Search ......... 315/105; 250/205, 214 AG

[56] References Cited

U.S. PATENT DOCUMENTS 4,687,919 8/1994 Nagano ............ 250/205

*Primary Examiner*—William L. Sikes
*Assistant Examiner*—James A. Dudek
*Attorney, Agent, or Firm*—Jordan B. Bierman; Bierman and Muserlian

[57] ABSTRACT

A mirror smudge detecting apparatus for detecting a smudge on a mirror member used in an image forming apparatus such as a copier. The apparatus includes a platen glass for supporting a document; a reference density panel having a reference density on the surface; an illumination lamp for irradiating the document at the platen glass and the reference density panel with a light beam; a sensor for detecting a reflection of the light beam from the document and the reference density member so that a document density signal, corresponding to a density of the document, and a reference density signal, corresponding to the reference density, are obtained; the mirror member, located in a path of the light beam between the illumination lamp and the sensor, for reflecting the light beam from the document and the reference density panel; the first output processing circuit for processing the reference density signal to obtain an irradiation controlling signal; a control circuit for controlling the illumination lamp according to the irradiation controlling signal; and the second output processing circuit for processing the reference density signal to obtain a mirror smudge detecting signal. In the apparatus, a dynamic range of the second output processing circuit is broader at a high reflection ratio side than a dynamic range of the first output processing circuit.

4 Claims, 17 Drawing Sheets

MIRROR SMUDGE DETECTING APPARATUS FOR AN IMAGE FORMING APPARATUS

BACKGROUND OF THE INVENTION

The present invention relates to a mirror smudge detecting apparatus used in a copier, and more particularly relates to an apparatus which detects, based on an amount of light reflected on a reference density section and entered into the apparatus through a mirror, a smudge on the mirror on which the light coming from a document is reflected.

A copier having the following structure is widely known as a generally used copier: a document placed on a transparent glass is illuminated from a lower portion; an optical image reflected from the document is reflected by a mirror so that the image is formed on a photoreceptor drum; the image is developed on the photoreceptor drum as a toner image; and after that, the image is transferred onto a copy sheet and fixed thereon (refer to Japanese Patent Publication Open to Public Inspection No. 82068/1989, and the like).

In the copier structured as described above, when a mirror, by which an optical image of the document is reflected, is smudged by toner or the like, a reflection ratio of the mirror is lowered, density for copying becomes higher, and the copying sheet becomes blackish, which is a problem.

Due to the foregoing, it is desired to provide an apparatus by which the mirror smudge is detected. However, it costs a great deal to exclusively provide a sensor for detecting the mirror smudge. Accordingly, the following apparatus has been previously proposed: a document density sensor, which is conventionally provided, is used for automatic density adjustment by which density of a copying sheet to be copied is automatically adjusted according to the density of the document; an amount of reflected light on the reference density section (a reference white plate) is detected by the document density sensor; and it is detected that an amount of reflected light from the reference density section is lowered due to the mirror smudge (refer to Japanese Patent Application No. 187142/1992).

However, in a document density detection system by the document density sensor, the system is set in the manner that the system can read out a broad range of the amount of light in order to cope with various document densities. Therefore, when the document density detection system is used in the conventional way, it can not highly accurately detect slight lowering of the amount of light caused by a mirror smudge, which is a problem. Further, in order to highly accurately detect the mirror smudge, it is necessary to adjust an output processing system of the sensor (an amplifier circuit), (gain adjustment, offset adjustment) so that it can cope with deviations of the document density sensor. In this case, it is troublesome for a serviceman to carry out the foregoing adjustment using a tester, which is a problem.

In view of the foregoing problems, the object of the present invention is to improve accuracy for the mirror smudge detection using the document density sensor, and to automatically carry out the adjusting operation to secure the foregoing accuracy.

SUMMARY OF THE INVENTION

In order to accomplish the foregoing object, a mirror smudge detecting apparatus according to the present invention is structured as follows. Illumination light from a light source is irradiated on the document; the reflected light from the document is reflected by a mirror and an optical image is formed by an optical system; and the formed optical image is developed. The detecting apparatus is further structured as follows: In a copier having; a document density sensor by which an amount of reflected light from the document, which is entered by a mirror, is detected; and a reference density section which is a reference for density detection carried out by the document density sensor, a detection signal is inputted from the document density sensor into output processing circuits composed of two systems including a document density detecting system and a mirror smudge detecting system having a broader dynamic range on a higher reflection ratio side than that of the document density detecting system. Then, the document density is detected according to the detection signal of the document density sensor which is obtained through the output processing circuit of the document density detecting system. Further, when the reflected light from the reference density section is entered into the document density sensor, the condition of the mirror smudge is detected according to the detection signal of the document density sensor obtained through the output processing circuit of the mirror smudge detecting system.

Further, the mirror smudge detecting apparatus according to the present invention is structured as follows: Illumination light from a light source is irradiated on the document; the reflected light from the document is reflected by a mirror and an optical image is formed by an optical system; and the formed optical image is developed. Further, in a copier having; a document density sensor by which an amount of reflected light from the document, which is entered by the mirror, is detected; and the reference density section which is a reference for density detection carried out by the document density sensor, when the light reflected from the reference density section is entered into the document density sensor, the condition of the mirror smudge is detected according to the detection signal of the document density sensor outputted through the output processing circuit of the mirror smudge detecting system. Further, the detecting apparatus is structured as follows: The foregoing output processing circuit is adjusted in the manner that; the light source is operated so that its light amount level is switched to a first light amount level and a second light amount level which are predetermined levels and differ from each other; the light reflected from the reference density section is entered into the document density sensor; and the difference between a detecting signal outputted through the output processing circuit when the level of the amount of light of the light source is switched to the first light amount level, and a detecting signal outputted through the foregoing circuit when the level of the amount of light of the light source is switched to the second light amount level, is a predetermined value.

According to the mirror smudge detecting apparatus of the copier structured as in the foregoing, two systems of output processing circuits, that is, an output processing circuit which is used for detecting an original document density, and an output processing circuit which is used for detecting the mirror smudge are individually provided to the apparatus. The output processing circuit for the mirror smudge detection is structured as follows: a dynamic range of the output processing circuit for the mirror smudge detection is broader than that of the output processing circuit for the document density detection on the high reflection ratio side. Accordingly, when the output circuits are separately used corresponding to their purpose, the various document densities can be broadly read, and further, lowering of the reflection ratio due to the mirror smudge on the high reflection ratio side can be accurately detected by the document density sensor.

Further, when the levels of the amount of light of the light source are respectively switched to the first light amount level and the second light amount level, the condition in which the amount of light is decreased by the difference between the first light amount level and the second light amount level, can be artificially formed. Accordingly, when the output processing circuit is adjusted so that the difference between detection signals at the time is a predetermined value, the adjustment can be carried out so that a constant output change can be obtained with respect to lowering of a practical reflection level of the amount of light.

DETAILED DESCRIPTION OF THE INVENTION

An example of the present invention will be described as follows.

Figure 1:
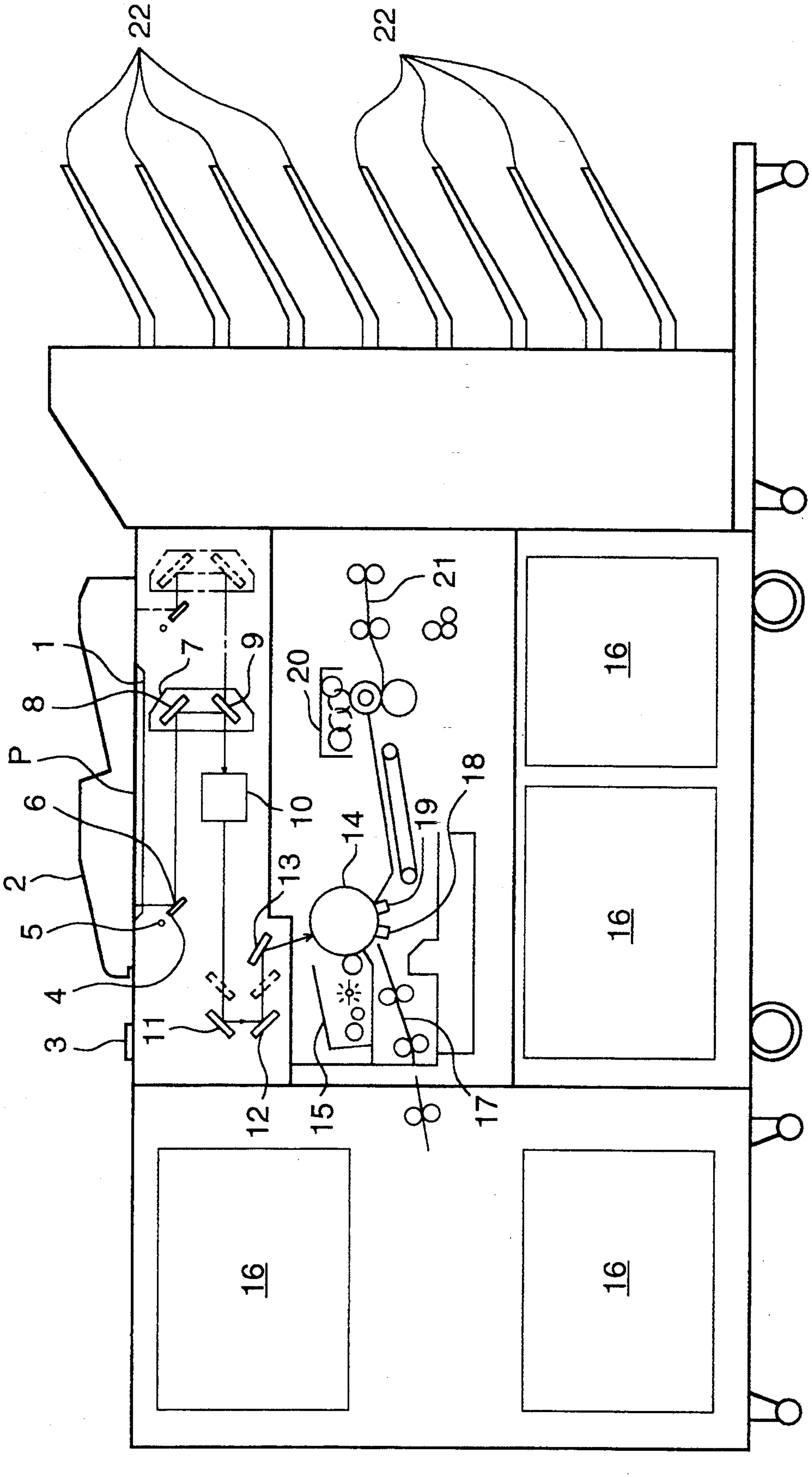
FIG. 1 is a view showing the entire structure of a copier with a mirror smudge detecting apparatus according to the present invention.

FIG. 1 shows the entire structure of a copier with a mirror smudge detecting apparatus according to the present invention.

At first, a basic structure and operation will be described as follows. A document P is placed on a platen glass 1, a document cover 2 is closed, and when a copy starting switch 3 is pressed, an exposure unit 4 is moved in a subsidiary scanning direction. The exposure unit 4 is integrally provided with a lamp (a light source) 5 and a first mirror 6. When the exposure unit is moved in the subsidiary direction, the recording surface of the document P is illuminated through the platen glass 1. Reflection light from the recording surface is guided to the first mirror 6 through a slit which is long in the primary scanning direction perpendicular to the subsidiary scanning direction, and is reflected in the subsidiary scanning direction by the first mirror 6.

A movable mirror unit 7 is provided in the subsidiary scanning direction of the exposure unit 4. The movable mirror unit 7 is symmetrically provided with a second mirror 8 and a third mirror 9 in the vertical direction. While the movable mirror 7 is being moved in the same direction as that of the exposure unit 4 and at a half speed of the exposure unit 4, the second mirror 8 and the third mirror 9 successively reflect the light reflected by the first mirror 6 of the exposure unit 4, and guide it to a lens unit (optical system) 10.

After an optical image of the document P collected by a lens unit 10, has been successively reflected by a fourth mirror 11, a fifth mirror 12 and a sixth mirror 13 which are provided at the back of the lens unit 10, the image is formed on a rotating photoreceptor drum 14.

A photoconductive layer is provided on the outer peripheral surface of the photoreceptor drum 14, and before the image is guided from the optical system, a DC high voltage is impressed upon the layer and, for example, the layer is positively charged uniformly. When the optical image is received on the layer by exposure scanning of the optical system under the foregoing condition, an electrical charge on a portion, on which the optical image is received, is discharged onto a metallic surface of the drum 14, and the remaining portion, on which the optical image is not received, is maintained under the condition that the portion is positively charged. Due to the foregoing, an electrostatic latent image corresponding to the original image is formed on the photoconductive layer.

When the photoreceptor drum 14 is further rotated, toner with a negative charge is attracted by the electrostatic force from a developing unit 15 to the positively charged portion, and then a toner image is formed thereon.

A copying sheet is supplied from a selected sheet feeding cassette in a sheet feeding unit 16 through a feeding roller 17, and the toner image is transferred onto the copying sheet by a transfer electrode 18 upon which the DC high voltage is impressed. The copying sheet, onto which the toner image has been transferred, is separated from the photoreceptor drum 14 by a separation electrode 19 upon which an AC voltage is impressed, further conveyed to a fixing unit 20 so that the toner image is fixed, and after that, is sent onto a predetermined tray 22 by a discharging roller 21.

Next, referring to FIG. 2 and FIG. 3, the structure provided for the automatic density adjustment will be explained as follows.

Figure 2:
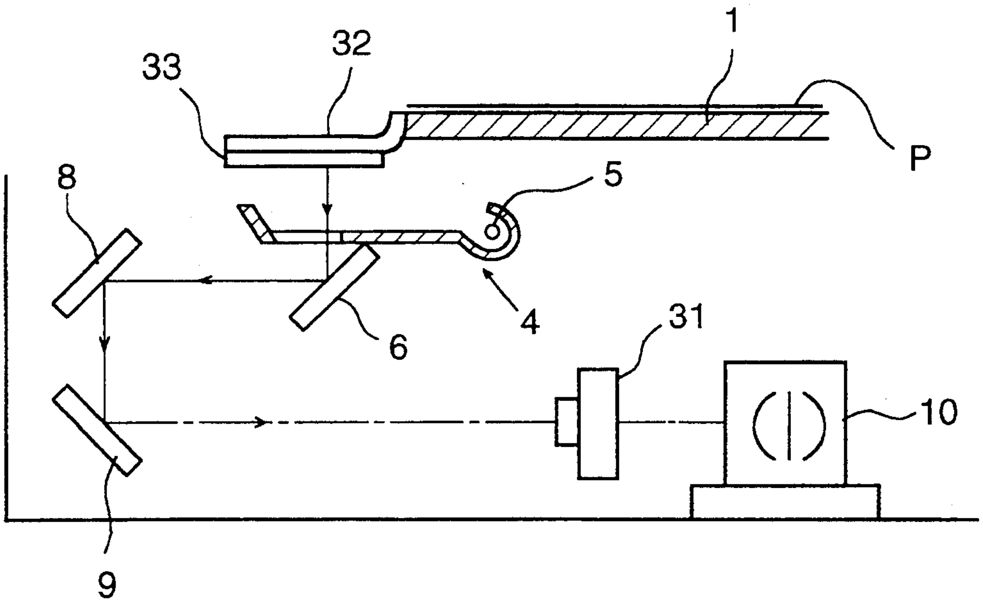
FIG. 2 is a vertical sectional view showing the structure of a document density detecting section in the copier.
Figure 3:
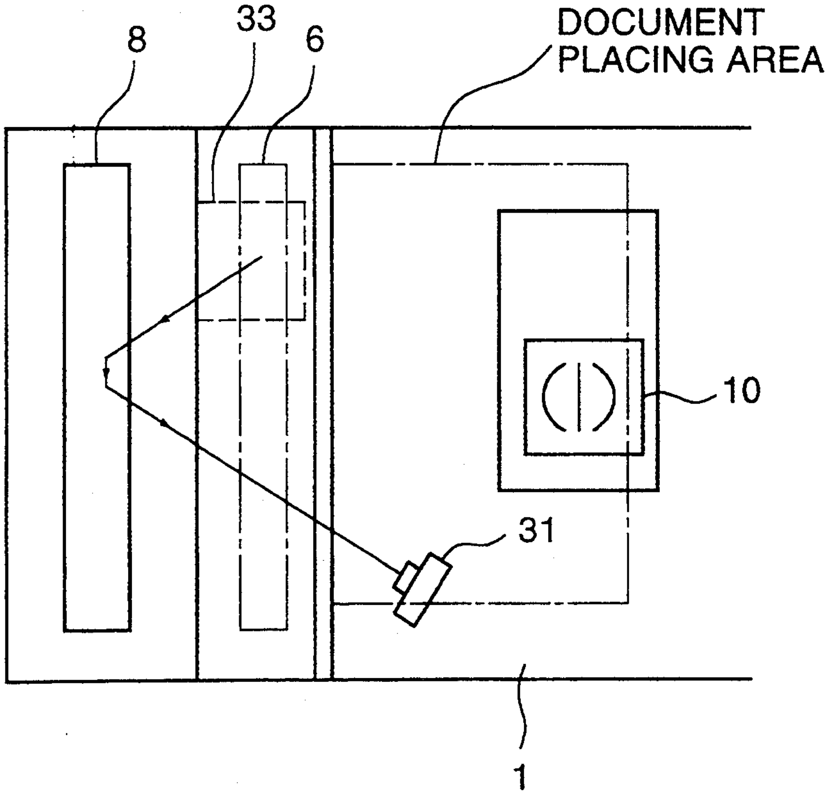
FIG. 3 is a sectional view showing the structure of the document density detecting section in the copier.

In FIG. 2 and FIG. 3, a density sensor (EE sensor) 31 to detect the document density is provided outside of the lens unit 10. The density sensor 31 functions as follows: the sensor 31 receives the reflection light from the document P through the first mirror 6, the second mirror 8 and the third mirror 9; an amount of received light is detected after photoelectric conversion; and thereby the average density of the document P is detected. An automatic density adjusting mode (EE mode), by which the recording density is automatically adjusted corresponding to the document density detected by the sensor 31, can be selected.

A reference density section (a reference white plate), the surface density of which is set to the reference density (reference white), is provided to the lower surface of a frame 32 by which a leading edge portion of the platen glass 1 is held. As shown in the drawings, the foregoing system is set as follows: when the exposure unit 4 is located outside of a document placement area, the reflection light from the reference density section 33 is reflected by the first mirror 6; further successively reflected by the second mirror 8 and the third mirror 9 of the movable mirror unit 7; and the reflected light enters the density sensor 31.

Then, when the automatic adjusting mode is selected, a preliminary scanning is carried out prior to exposure scanning for copying, and the reflection light from the document is detected by the density sensor 31. Further, after the document density has been detected, an amount of reflected light from the reference density section 33 is detected; the document density is discriminated by using the amount of reflected light from the reference density section 33 as the reference density; and the automatic density adjustment (an output of bias data corresponding to the document density) is carried out according to the discrimination result.

Figure 4:
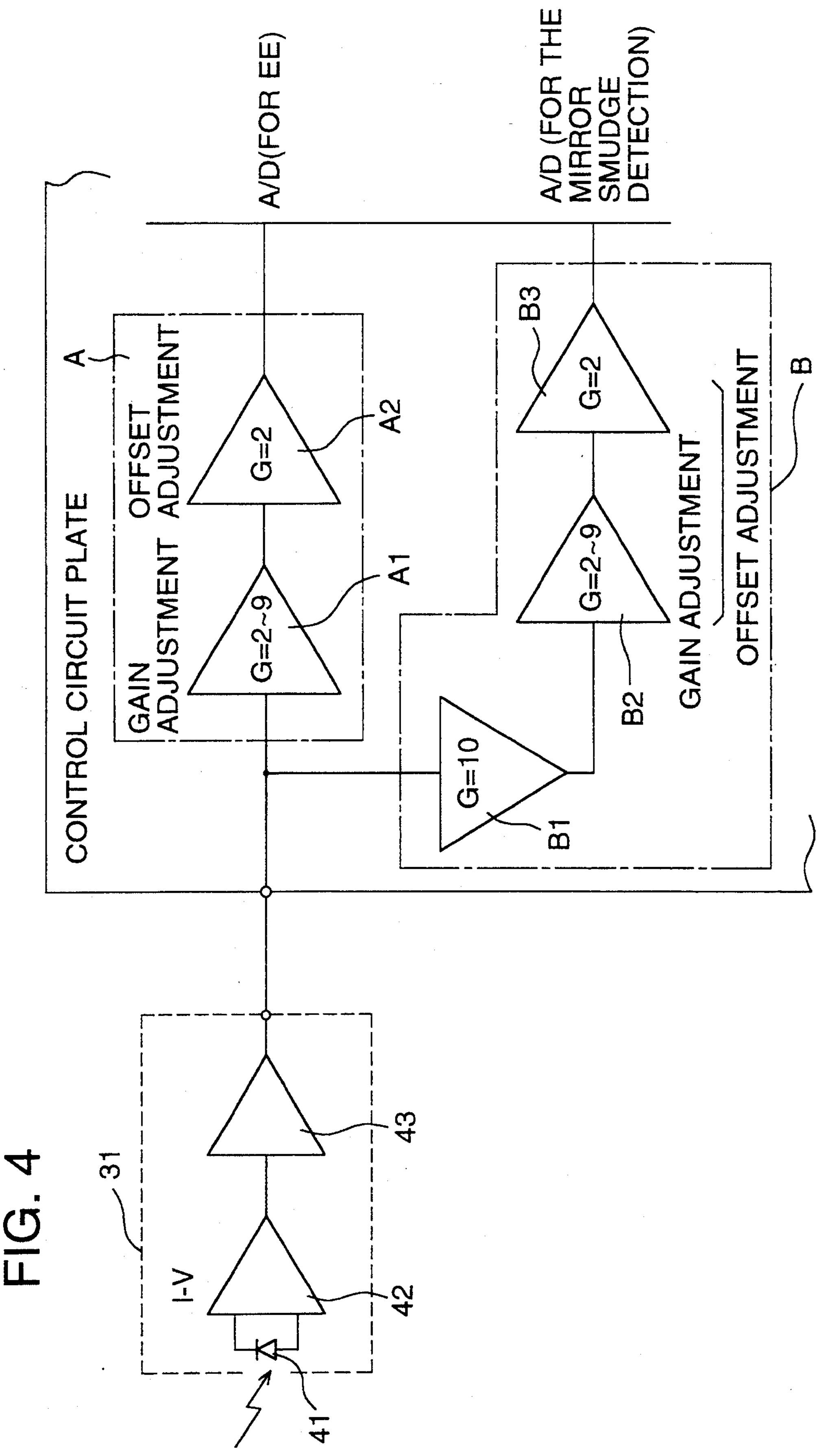
FIG. 4 is a circuit diagram showing an output processing circuit of a density sensor.

Here, as shown in FIG. 4, the density sensor 31 is composed of a photoelectric conversion element 41, a current voltage conversion circuit 42, and an amplifier circuit 43. A detection signal (voltage signal) outputted corresponding to an amount of light entered from the density sensor 31, as shown in FIG. 4, is entered into amplifier circuits (output processing circuits) A and B which are individually provided for the automatic density adjustment (for EE) and for the mirror smudge detection. Then, Outputs from the amplifier circuits are respectively A/D-converted, and read into a microcomputer, not shown in the drawings.

Figure 5:
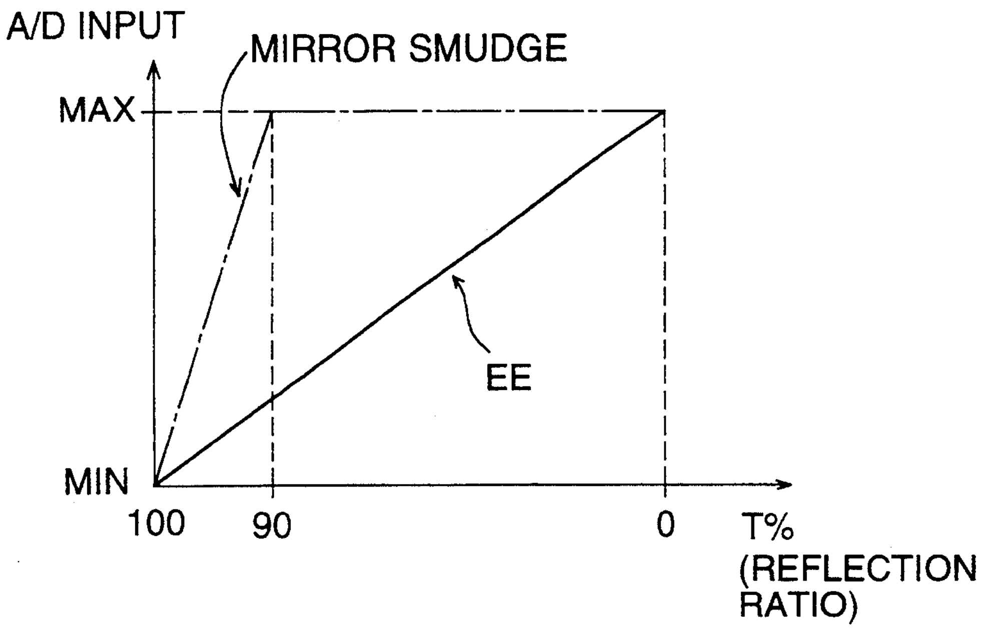
FIG. 5 is a diagram showing characteristics of an amplifier circuit (the output processing circuit).

Characteristics of the amplifier circuits A and B are set as shown in FIG. 5. The amplifier circuit A for the automatic density adjustment is set in the manner that the circuit A has resolution covering the entire range of the reflection ratio from 0% to 100% in order to widely correspond to the document density. On the other hand, the amplifier circuit B for the mirror smudge detection is set in the manner that the detection signal on the high reflection ratio side can be read by high resolution when a dynamic range from the minimum of the signal to the maximum thereof is fully used up only on the high reflection ratio side (90% to 100%).

Due to the foregoing, when the reflection light from the reference density section 33 (the white reference plate) is detected by the density sensor 31 through various kinds of mirrors, slight lowering of the amount of light caused by the mirror smudge can be accurately detected by using the exclusive amplifier circuit B.

Figure 6:
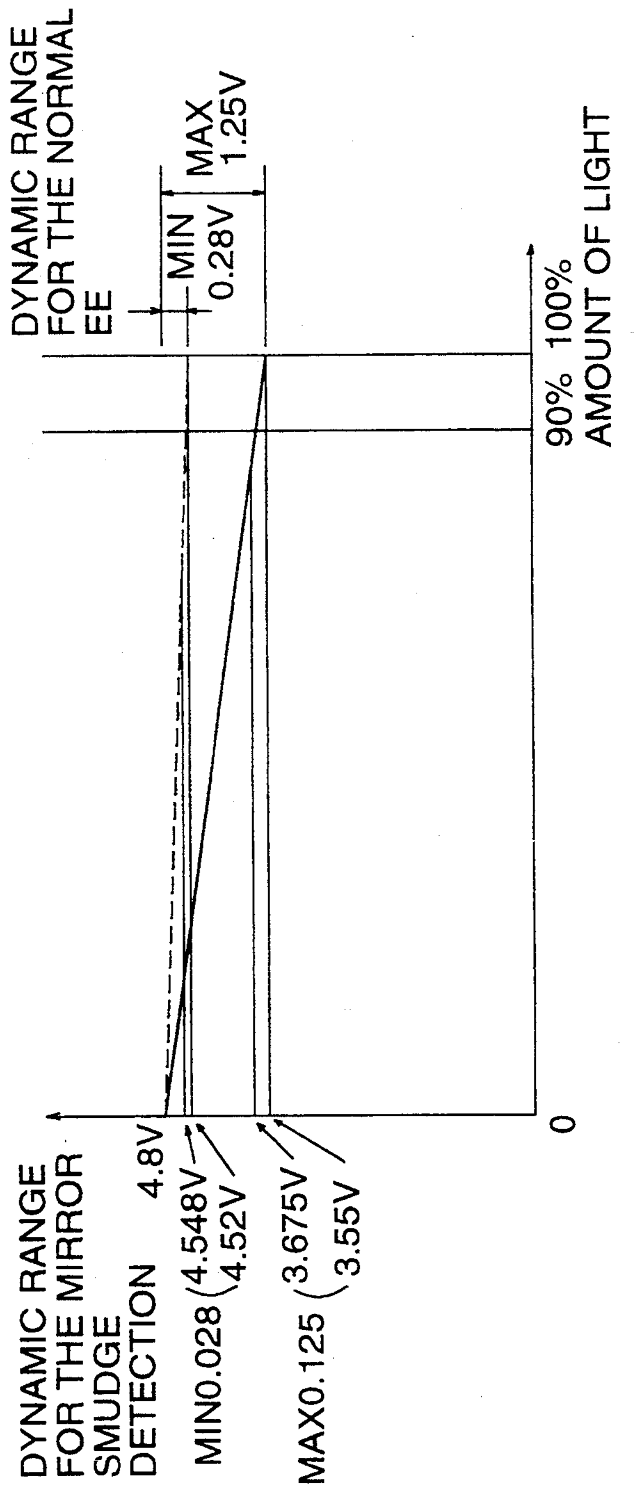
FIG. 6 is a diagram showing an example of the output characteristics of the density sensor.

For example, in the case where the density sensor 31 has the output characteristics as shown in FIG. 6, in the automatic density adjustment to detect the range from 0% of the amount of light to 100% thereof, a sensor output has a dynamic range from 0.28 V at the minimum to 1.25 V at the maximum even when the characteristics of the sensor are dispersed. In a general mirror smudge, it is necessary to detect not more than 10% of a change of the amount of light. In this case, it is necessary to detect a change of the amount of light within 0.028 V using a sensor having the minimum dynamic range, and to detect that within 0.125 V using the sensor having the maximum dynamic range.

Accordingly, when detection data for the automatic density adjustment is used for the mirror smudge detection as it is so that the mirror smudge is detected, it is difficult to highly accurately detect a slight change of the amount of light caused by the mirror smudge.

Since it is desired to secure a broad dynamic range within a range from 100%i of the amount of light to 90% thereof, two amplifier circuits A and B having the gain characteristics different from each other are provided, as described above, and are structured as follows. As the circuit A for the automatic density adjustment, the output is gradually changed within the range from 0% of the amount of light to 100% thereof so that the broad range of the amount of light can be detected. As the circuit B for the mirror smudge detection, the output is sharply changed from the minimum output to the maximum output within the range from 100% of the amount of light to 90% thereof so that the range of the amount of light on the high reflection ratio side can be detected with high resolution.

Concretely, the mirror smudge detection using the density sensor 31, the reference density section 33, and the amplifier circuit B is carried out as follows.

Figure 7:
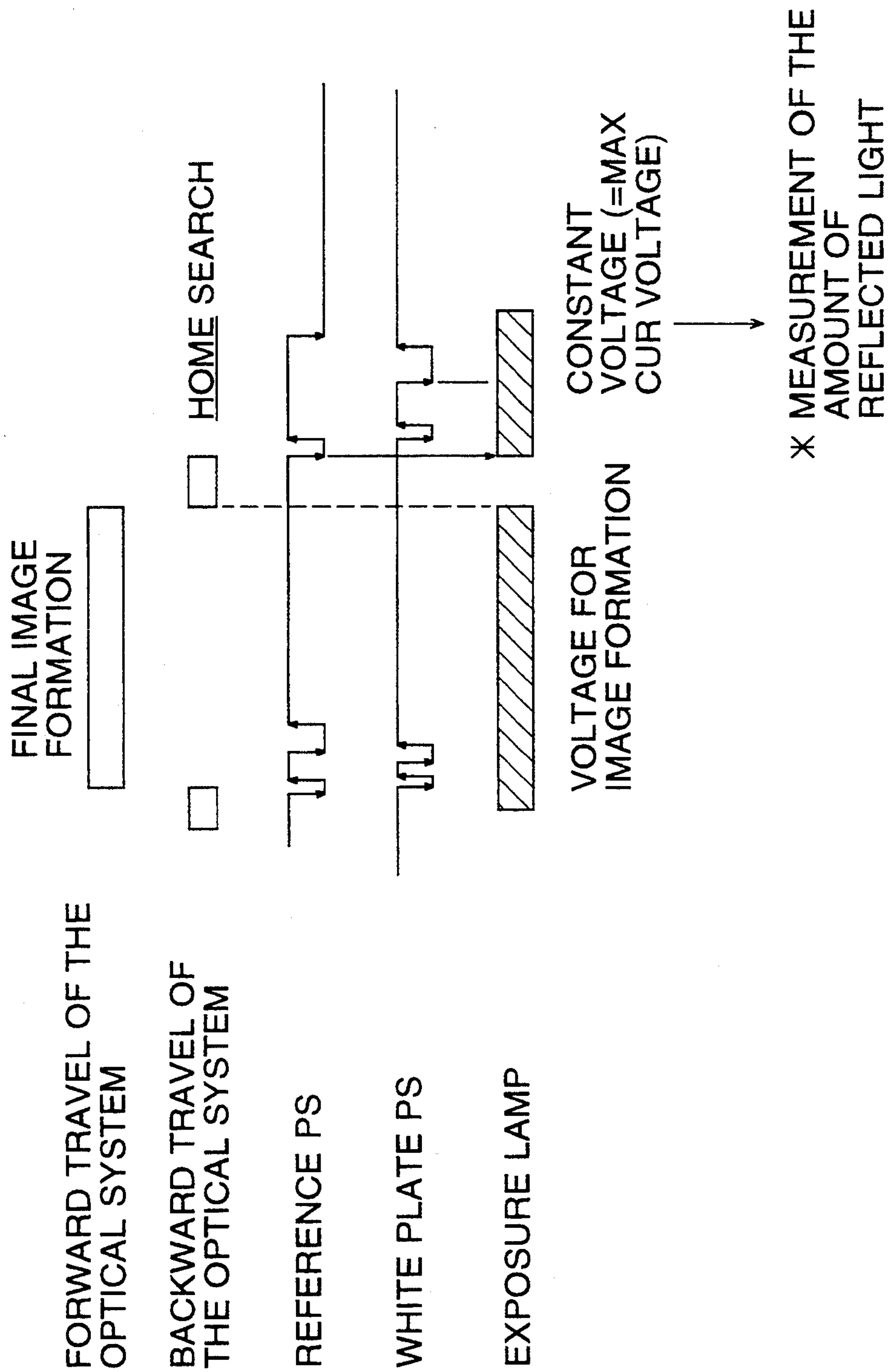
FIG. 7 is a time chart showing detection timing of a mirror smudge detecting operation.

That is, as shown in FIG. 7, after the image formation has been completed, when a home search operation of the exposure unit 4 is carried out, the maximum voltage is impressed upon the lamp 5 at the first detection timing by a reference position sensor (reference P S), and the lamp 5 is turned ON as a light source for the mirror smudge detection irrespective of the image forming operation; and when a reference density position sensor (white plate P S) detects a position from which the reflection light from the reference density section 33 is entered into the density sensor 31, amount of reflected light data which is read through the amplifier circuit B at the time, is sampled.

Then, the sampled data of the amount of reflected light is compared with the reference reflection data of the amount of light which corresponds to the no smudge condition, and when it is detected that the sampled amount of reflected light is decreased lower than a predetermined level, this system discriminates that it is caused by the mirror smudge.

When the mirror smudge is detected as described above, a lamp which warns the mirror smudge generation is turned ON; the amount of light of the lamp 5 is adjusted so as to be increased at the time of the copying operation depending on a degree of the mirror smudge; or developing density is compensated so as to be decreased at the time of development, and thereby it is prevented that the amount of light reflected from the document image is decreased due to the mirror smudge and the color of the image is more deeply copied than usual.

In a copier having the automatic density adjusting function using the density sensor 31, gain adjustment and offset adjustment of the amplifier circuit A are commonly carried out in order to correspond to dispersion of the characteristics of the density sensor 31. Accordingly, also in the case where the amplifier circuit B is separately provided as the circuit for detecting the mirror smudge as shown in the example, it is desired that gain adjustment and offset adjustment are automatically carried out so that a stable detecting accuracy can be secured.

Accordingly, in the example, adjustment of the amplifier circuit B for the mirror smudge detection is carried out successively after adjustment of the amplifier circuit A for the automatic density adjustment has been carried out, which will be described as follows.

Here, the automatic adjustment operation will be described according to flow charts shown in FIG. 8 to FIG. 14.

Figure 8:
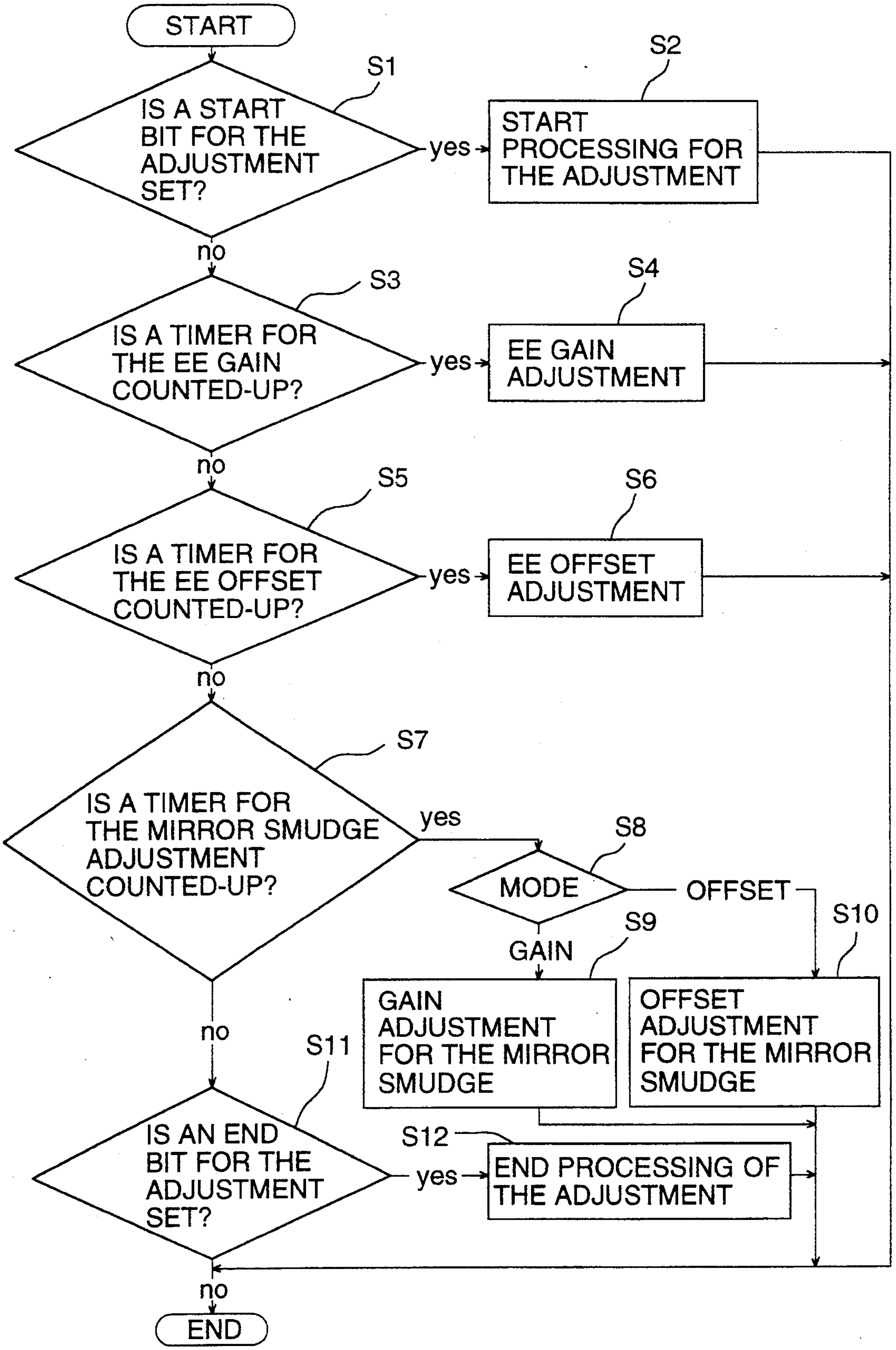
FIG. 8 is a flow chart showing the entire flow of an amplifier circuit adjustment operation.

In a flow chart as shown in FIG. 8, at first, in a step S1, it is discriminated whether an adjustment start bit, which indicates the adjustment operation, is set. When the adjustment start bit is set, the sequence advances to a step S2, and an adjustment start processing operation is carried out.

Figure 9:
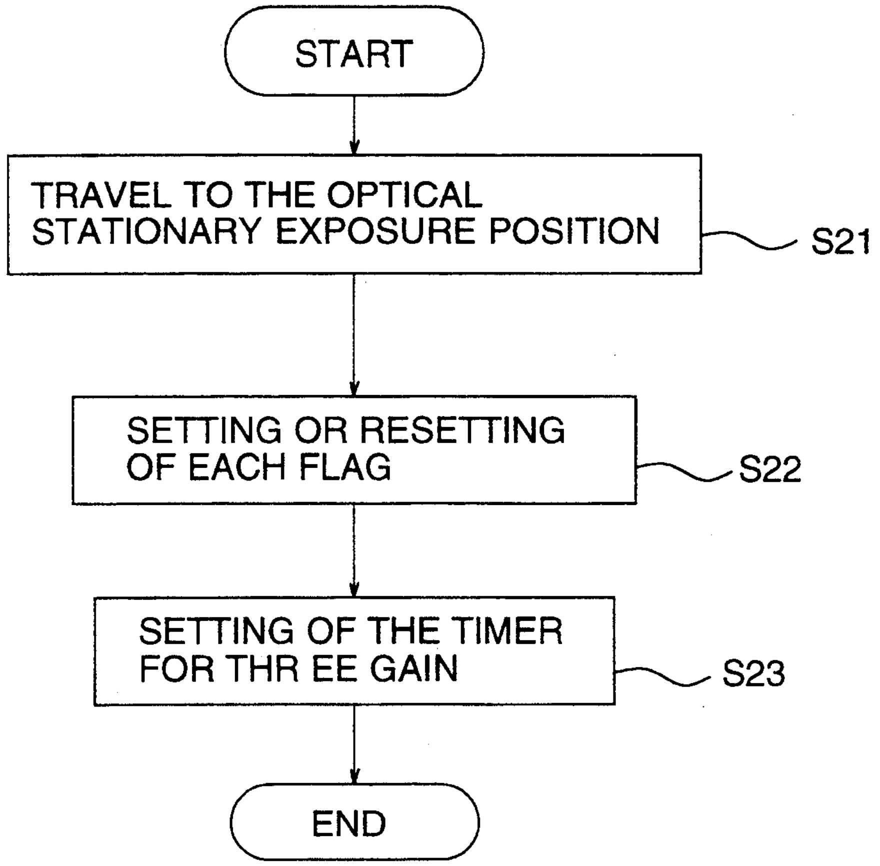
FIG. 9 is a flow chart showing start processing of the amplifier circuit adjustment operation.

The content of the adjustment start processing operation in the step S2 is shown in a flow chart shown in FIG. 9. As the adjustment start processing operation, the following operations are carried out: the exposure unit is moved to a predetermined exposure position (a step S 21); every ,kind of flag is set or reset (a step S 22); and further, a timer to start the gain adjustment operation of the amplifier circuit A of the automatic density adjustment side is set (a step S 23).

When the adjustment start processing operation has been carried out, since the timer to start the gain adjustment operation of the automatic density adjustment (E E) side is set as described above, the sequence advances from a step S3 to a step S4 in a flow chart shown in FIG. 8, and the gain adjustment operation of the automatic density adjustment (E E) side is carried out.

Figure 10:
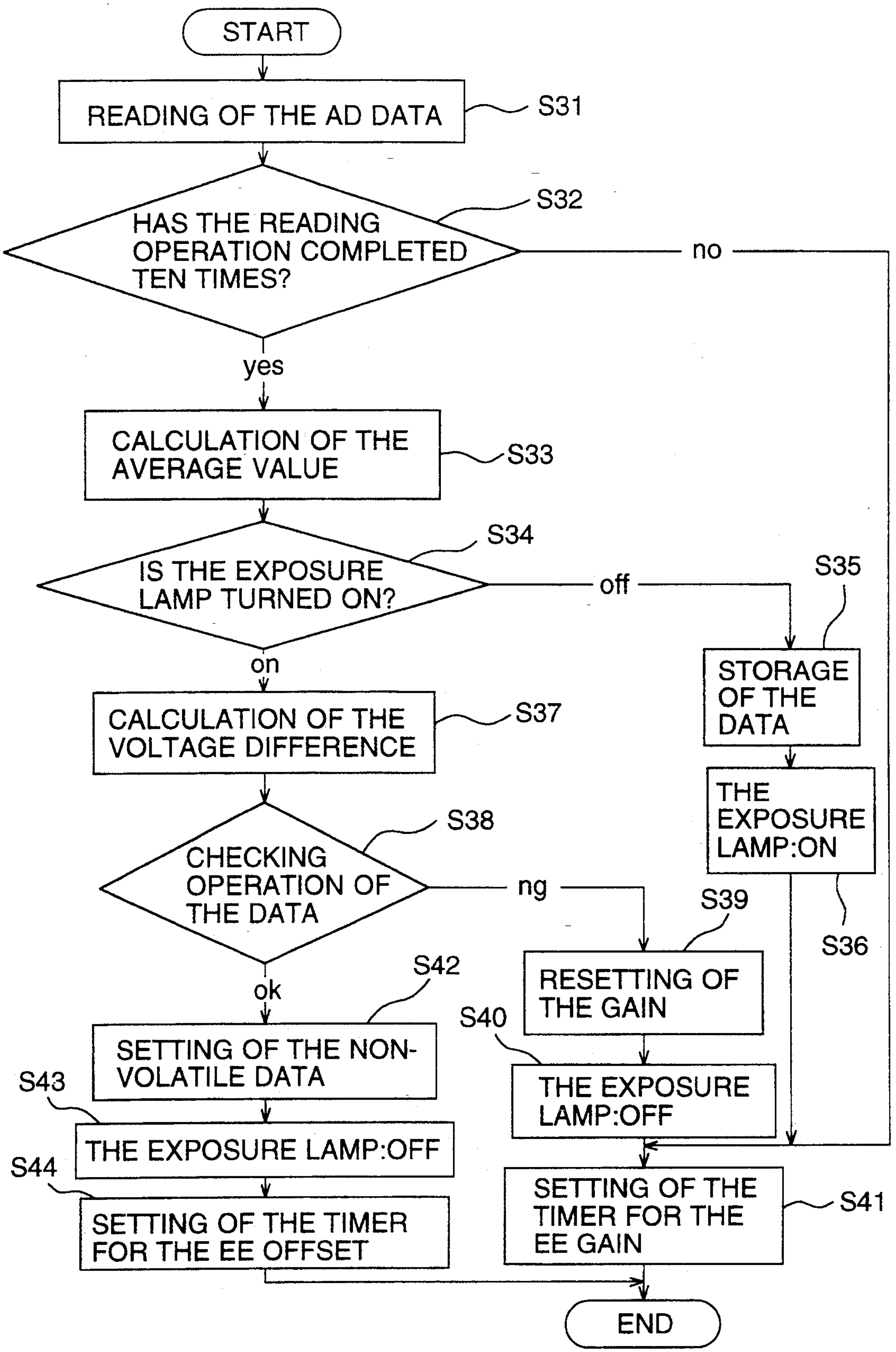
FIG. 10 is a flow chart showing a gain adjustment operation on an EE side.

The gain adjustment operation of the automatic density adjustment (E E) side is shown in a flow chart in FIG. 10. In the gain adjustment operation of the automatic density adjustment (E E) side, the following operations are carried out. A chart for adjustment (white sheet) is previously set on the platen glass 1; the reflected light from the chart for adjustment is detected by the density sensor 31; as will be described later, the exposure lamp is turned ON or OFF, and an amount of reflected light from the chart for adjustment is respectively detected corresponding to the cases where the exposure lamp is turned ON or OFF; and the gain is adjusted according to the result of detection.

In a flow chart shown in FIG. 10, at first, detection data (voltage value) of the amount of reflected light inputted from the density sensor 31 through the amplifier circuit A is A/D-converted and read in a step S 31.

Next, in a step S 32, it is discriminated whether reading of the detection data of the amount of reflected light is carried out ten times. When the number of times is smaller than ten, the sequence Jumps to a step S 41; a timer to start again the gain adjustment operation of the automatic density adjustment side is set, and the detection data is successively read.

When the detection data has been read ten times, the sequence advances to a step S 33, and an averaged value of ten data of the amount of reflected light obtained by reading it ten times is calculated.

Next, in a step S 34, it is discriminated whether the exposure lamp has been turned ON, and when the result of detection by the density sensor 31 is read under the condition that the exposure lamp is turned OFF, which is an initial condition, the sequence advances a step S 35, In the step S 35, data of the calculated average value is stored as detection data which corresponds to the reflection data of 0% (lamp: OFF), and next, in a step 36, the exposure lamp is turned ON when voltage is maximum.

While the exposure i lamp is turned ON by the maximum voltage, ten detection data of the amount of reflected light are sampled, and after the average value of sampled data has been calculated, the sequence advances from the step S 34 to a step S 37.

In the step S 37, the difference (voltage difference) between the detection data obtained when the exposure lamp is turned OFF and the detection data obtained when the exposure lamp is turned ON, is calculated.

In the next step S 38, it is checked whether the calculated voltage difference coincides with a predetermined value, and when the voltage difference does not coincide with a predetermined value, the sequence advances to a step S 39. In the step S 39, a gain of a first stage amplifier A1 in the amplifier circuit A is changed so that the voltage difference comes near a predetermined value, and in the next step S 40, the exposure lamp is turned OFF again.

Due to the foregoing, detection data when the exposure lamp is turned OFF, and that when the exposure lamp is turned ON, are respectively sampled again in the adjusted gain.

When the voltage difference between the detected voltage value when the exposure lamp is turned OFF, and the detected voltage value when the exposure lamp is turned ON, is equal to a predetermined value by repeating the foregoing adjustment, the sequence advances from the step S 38 to a step S 42, ,and the adjusted gain is stored as nonvolatile data.

Next, in the next step S 43, the exposure lamp is turned OFF, and in the next step S 44, a timer for offset adjustment is set so that the offset adjustment operation of the automatic density adjustment (E E) side is carried out.

When the gain adjustment operation has been completed and the offset adjustment timer is set, the sequence advances from the step S5 to the step S 6 in a flowchart shown in FIG. 8, and the offset adjustment operation of the automatic density adjustment (E E) side is carried out.

Figure 11:
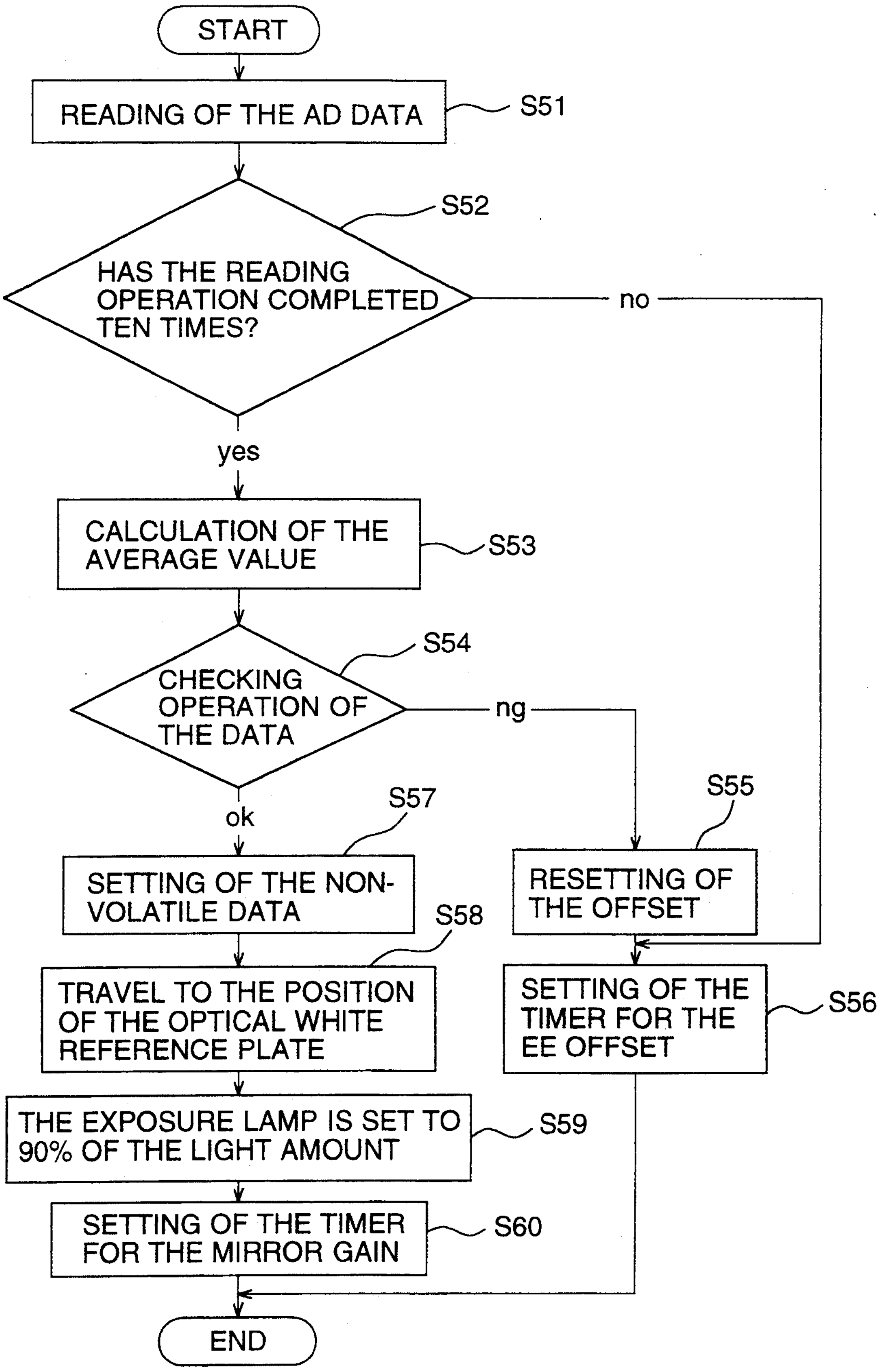
FIG. 11 is a flow chart showing an offset adjustment operation on the EE side

It is intended that the foregoing offset adjustment is carried out under the condition that the exposure lamp is turned OFF according to a flow chart shown in FIG. 11.

In the offset adjustment operation, detection data by the density sensor 31 is also read ten times in the same way as the foregoing gain adjustment operation (a step S 51, a step S 52), and their average value is calculated (a step S 53).

Then, it is checked whether the average value coincides with a predetermined reference level (S 54), and when the average value does not coincide with the predetermined reference level, the following operations are carried out: the offset value of the amplifier circuit A (an amplifier A 2, of which the amplifier circuit A is composed), is changed and set again (a step S 55); the offset adjustment timer is set (a step S 56); data is read, and the data check and offset changing operations are repeated until the offset adjustment operation has been completed.

When the offset adjustment operation has been completed, the final offset data is stored as nonvolatile data (a step S 57).

Next, in order to carry out the adjustment operation of the amplifier circuit B of the mirror smudge detection system, the exposure unit is moved to a position in which the reflected light from the reference density section 33 (reference white plate) is detected by the density sensor 31 (a step S 58); voltage $V_2$ is impressed upon the exposure lamp so that the lamp can emit a light beam with the amount of light of 90% (90% of the maximum amount of light which can be obtained when the maximum voltage is impressed upon the lamp), and the exposure lamp is turned ON (a step S 59); and the gain adjusting timer of the mirror smudge detecting system is set at step S 60).

When the gain adjusting timer of the mirror smudge detecting system is set, the sequence advances from the step S 7 to the step S 8 in the flow chart shown in FIG. 8; here, it is discriminated whether the present mode is a gain adjustment mode or an offset adjustment mode; and the sequence advances to either of the step S 9 or the step S 10 corresponding to the result of the discrimination, and the adjustment operation is carried out.

At first, the adjustment operation of the gain adjustment side is carried. The content of the gain adjustment of the mirror smudge detection system expressed by the step S 9 shown in the flow chart in FIG. 8, is shown in a flow chart in FIG. 12.

Figure 12:
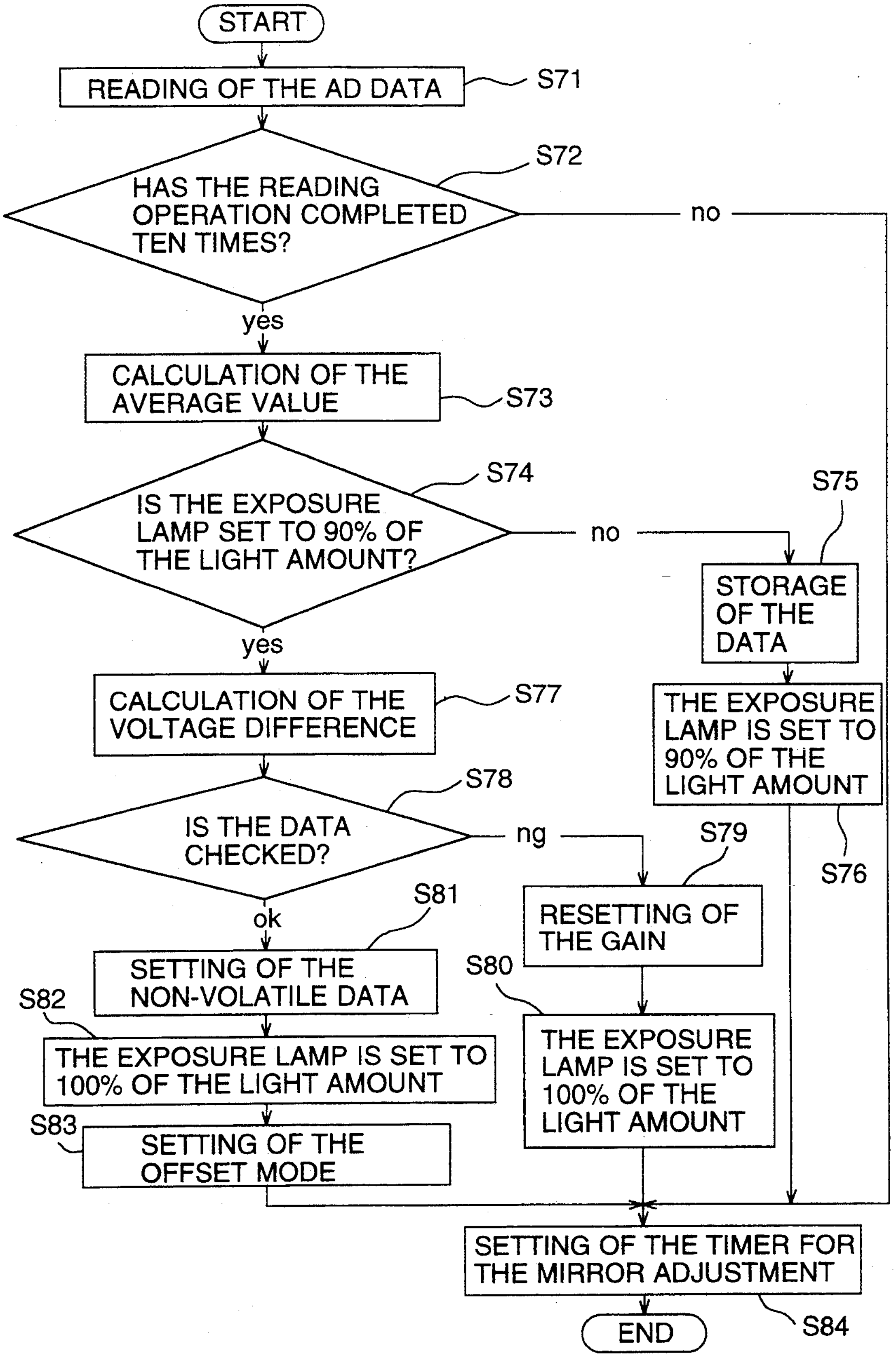
FIG. 12 is a flow chart showing the gain adjustment operation on a mirror smudge detection side.

In the flow chart shown in FIG. 12, data of an amount of the light reflected from the reference density section 33 is read ten times, and their average value is calculated (a step S 71 to a step S 73). Then, it is discriminated whether the average value is obtained under the condition that the exposure lamp emits a light beam with an amount of light of 90% (the step S 74). When the exposure lamp does not emit a light beam with an amount of light of 90%, that is, when the exposure lamp emits a light beam with an amount of light of 100%, the sequence advances from the step S 74 to a step S 75. When the exposure lamp emits a light beam with an amount of light of 100%, an illuminated light is reflected on the reference density section 33, and the data of an amount of reflected light detected by the density sensor 31 through various mirrors is stored in the step S 75.

Next, in order to carry out sampling on the detection data of the amount of reflected light when the exposure lamp emits a light beam with the amount of light of 90% the voltage by which the amount of light of 90% is obtained with respect to the amount of light (the amount of light of 100%) obtained when the maximum voltage is impressed, is impressed (a step S 76). When an amount of light reflected from the reference density section 33 in the case where the exposure lamp emits a light beam with the an amount of light of 90% is detected by the density sensor 31, and its average value is calculated, the difference (the difference of voltage) between the detected data (a voltage value) at the time of the amount of light of 90% and that at the time of the amount of light of 100% is calculated (a step S 77).

Here, it is checked whether the calculated voltage difference is equal to a predetermined reference voltage difference (a step S 78). When the calculated voltage difference is not equal to the reference voltage difference, the following operations are carried out: the gain of the amplifier-circuit B is adjusted (a step S 79); an amount of light of the exposure lamp is set to 100% again (a step S 80); and a sampling operation on a detected value at the amount of light of 100% (the first light amount level) and that on a detected value at the amount of light of 90% (the second light amount level) is carried out under the condition that the gain is set after the adjustment.

That is, when the level of the amount of light is decreased by 10% it is discriminated by the voltage difference whether a change of the detected voltage value corresponding to this decrease of 10% is generated on the density sensor 31. When the amount of light is decreased by 10%, the gain of the amplifier circuit B is adjusted so that the voltage is changed by a constant voltage value.

When the difference between the detected value at the amount of light of 90% and that at the amount of light of 100%, is coincide with the reference, it is discriminated that the gain adjustment operation is completed, and the final adjusted gain is stored as a nonvolatile data (a step S 81). Next, in order to carry out an offset adjustment operation, the maximum voltage is impressed upon the exposure lamp so that it can emit the amount of light of 100% (a step S 82), and further, an offset adjustment mode is set (a step S 83).

A timer is set in a step S 84 in order to continue the adjustment of the mirror smudge detection system. While the timer is set, the sequence advances from the step S 7 to the step S 8 in a flow chart shown in FIG. 8, and the adjustment operation of the mirror smudge detection system is carried out.

Figure 13:
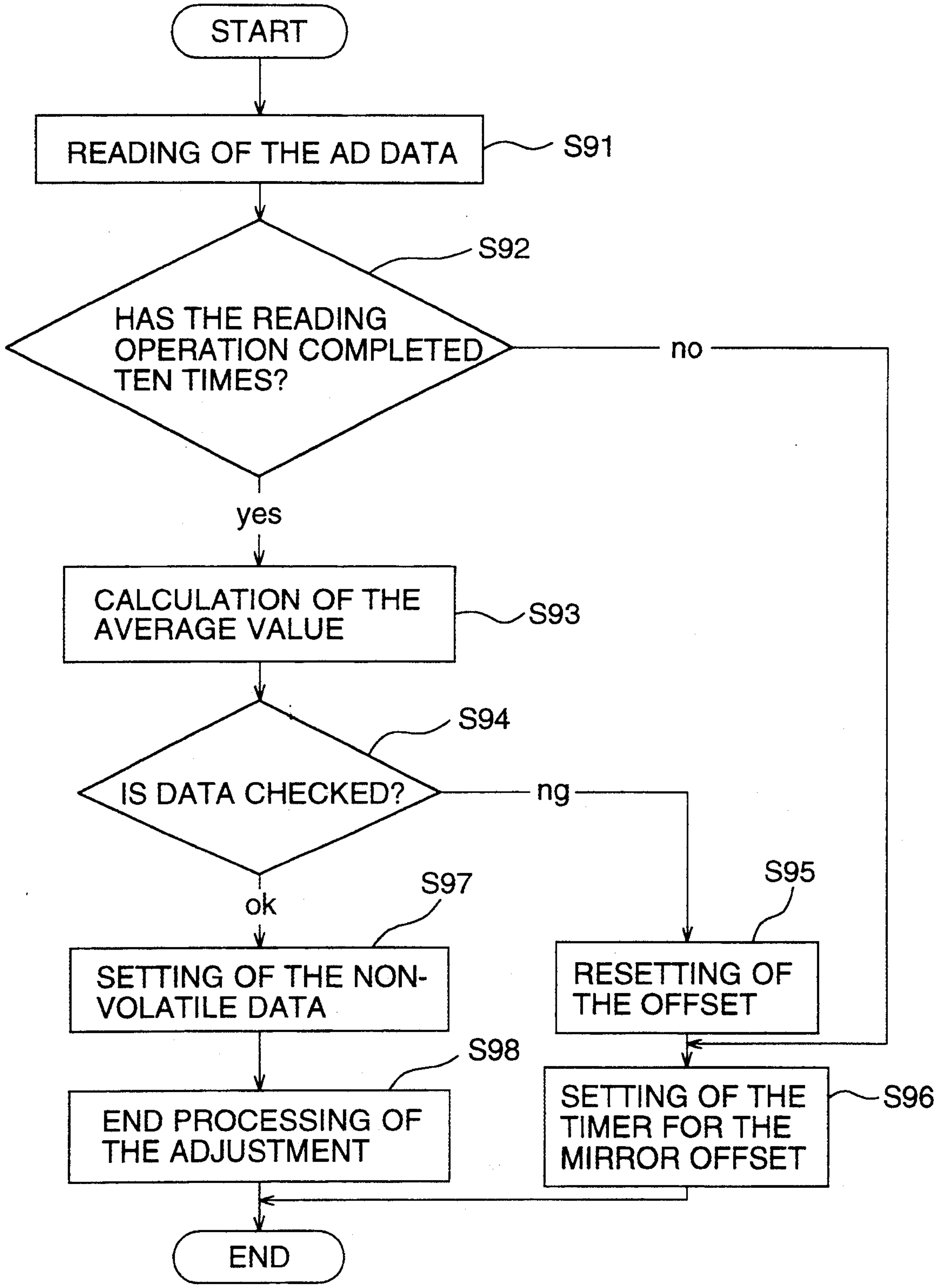
FIG. 13 is a flow chart showing the offset adjustment operation on the mirror smudge detection side.

When the offset adjustment mode is set in the step S 83 in a flow chart shown in FIG. 12, the sequence advances from the step S 8 to the step S 10 in the flow chart shown in FIG. 8, and the offset adjustment operation of the mirror smudge detection system is carried out as shown in a flow chart in FIG. 13.

The offset adjustment operation is carried out as follows. A sampling operation of the value, which is detected by the density sensor 31, of an amount of light reflected from the reference density section 33 is carried out ten times (steps S 91, S 92) under the condition that the exposure lamp emits the amount of light of 100%. Then, it is discriminated whether an average value (a step S 93) obtained by the foregoing operation, approximately coincides with a predetermined reference level (a step S 94), and an offset of the amplifier circuit B is changed so that the data detected when the exposure lamp emits the amount of light of 100%, approximately coincides with the reference level (a step S 95). Finally, when the adjustment operation has been completed, the offset data is stored as nonvolatile data (a step S 97), and an adjustment end processing operation is carried out (a step S 98).

Until the foregoing offset adjustment operation is completed, the sequence advances to a step S 96, and an offset adjusting timer is set so that the offset adjustment operation can be continuously carried out.

Figure 14:
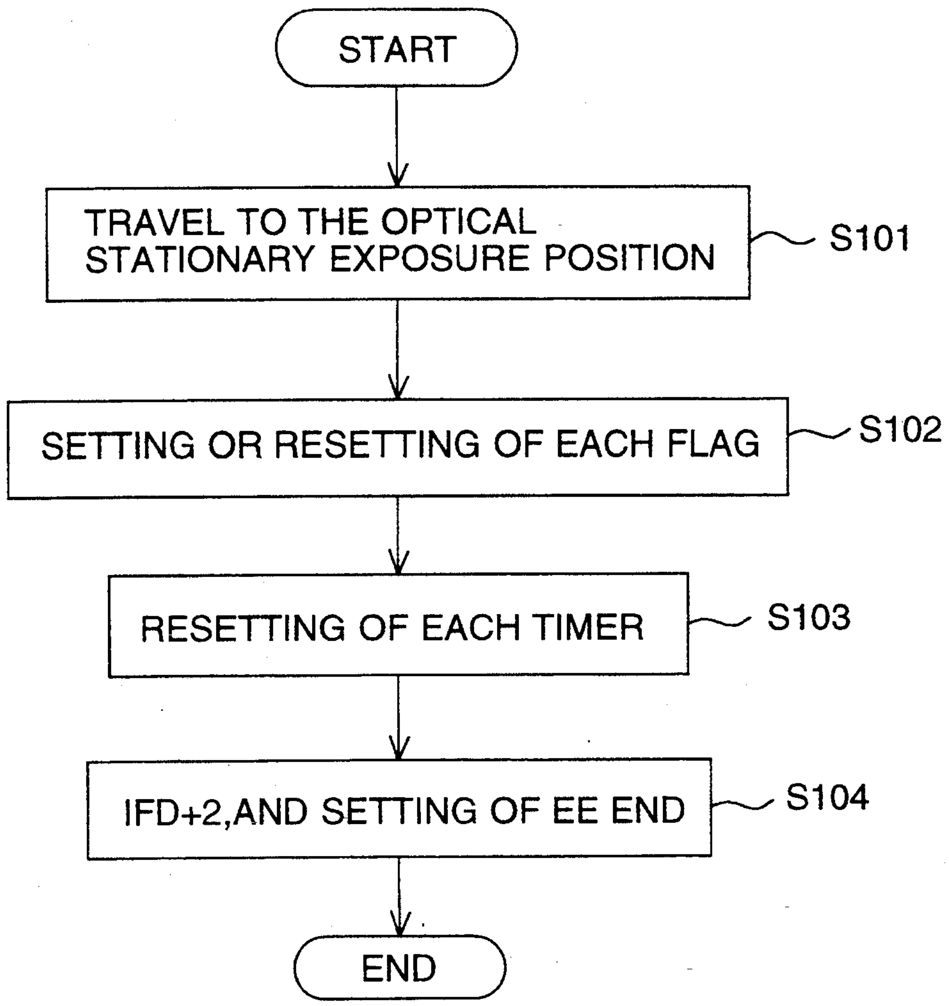
FIG. 14 is a flow chart showing an end processing of the amplifier circuit adjustment operation.

When the gain and offset adjustment operations in the amplifier circuit B of the mirror smudge detection side have been completed successively to those in the amplifier circuit A of the automatic density adjustment side as described above, the sequence advances from the step S 11 to the step S 12 in the flow chart shown in FIG. 8, and the adjustment end processing operation shown in a flow chart shown in FIG. 14 is carried out in the foregoing step S 12.

In the adjustment end processing operation, the exposure unit is moved to a predetermined exposure position (home position) (a step S 101), each kind of flag is set or reset (a step S 102), and each timer is reset (a step S 103). Further, an adjustment end bit showing that all adjustment operations have been completed, is set (a step S 104).

Next, more specific contents in the gain and offset adjustment operation of the amplifier circuit B of the mirror smudge detection system described above will be explained as follows.

Figure 15:
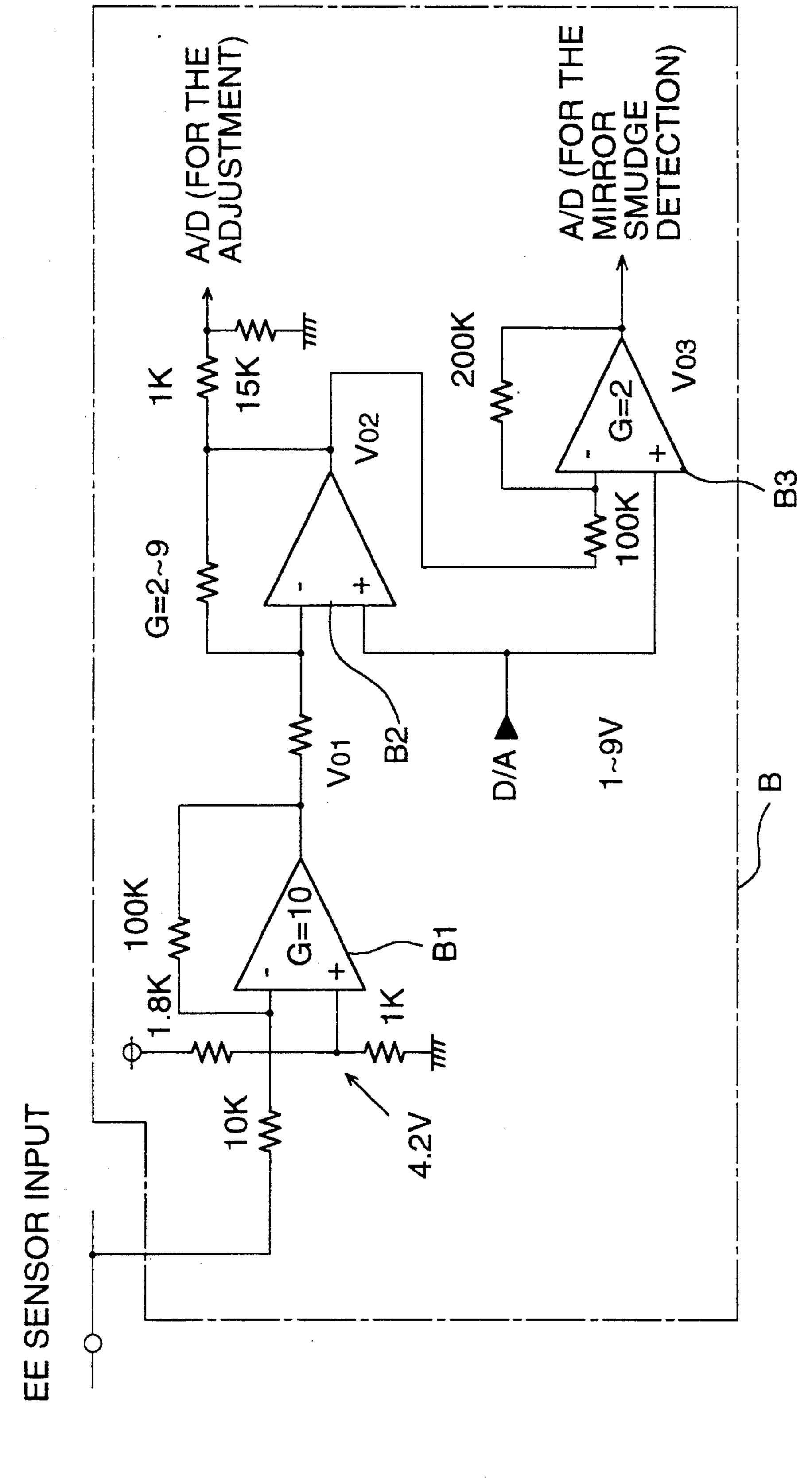
FIG. 15 is a circuit diagram showing an amplifier circuit on the mirror smudge detection side.

FIG. 15 is a view showing the detailed structure of the amplifier circuit B of the mirror smudge detection system shown in FIG. 4. The detection signal (voltage signal) outputted from the density sensor 31 is inputted into an amplifier circuit B1 in which the gain G is set to 10, and an output voltage $V_{01}$ outputted from the amplifier circuit B1 is inputted into an amplifier circuit B2 in which the gain G can be set variably within the range from 2 to 9. An output voltage $V_{02}$ outputted from the amplifier circuit B2 is inputted into an amplifier circuit B3 in which the gain G is set to 2, and an output voltage $V_{03}$ outputted from the amplifier circuit B3 is read as a sensor output for the mirror smudge detection.

The output voltage $V_{02}$ outputted from the amplifier circuit B2 is A/D-converted as adjustment data and read. A voltage, which is set variably within the range from 1 V to 9 V corresponding to offset control data, and outputted from a D/A converter not shown in the drawing, is inputted into the amplifier circuits B2 and B3 as an offset voltage. Further, a voltage of 4.2 V, as the offset voltage, is inputted into the amplifier circuit B1 as a fixed voltage.

Figure 16:
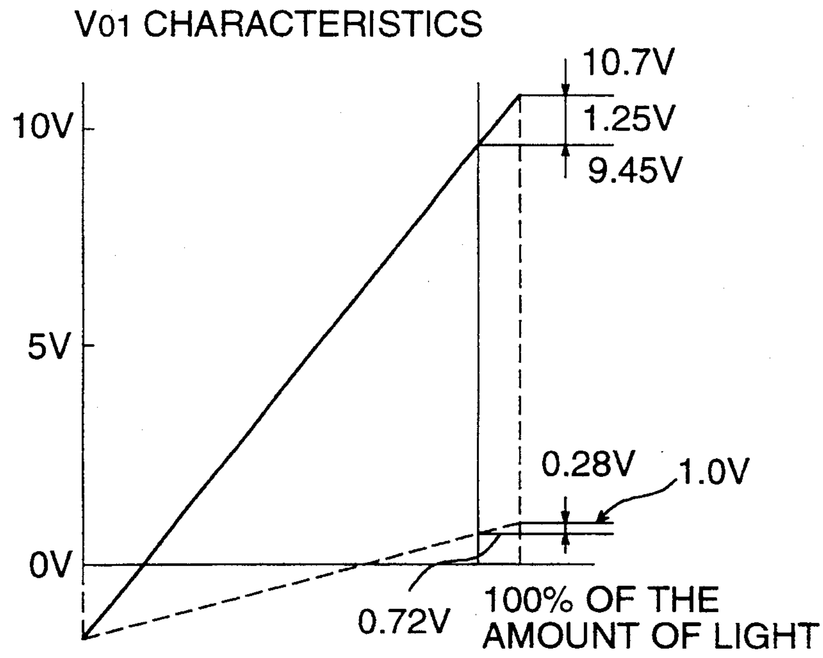
FIG. 16 is a view showing the output characteristics of the amplifier circuit one the mirror smudge detection side.

In the foregoing amplifier circuit B1, the gain is set to 10, as described above, so that the width of the dynamic range which is provided by the density sensor 31 itself in the entire range of an amount of light (0 to 100%) as shown in FIG. 6, can be obtained when an amount of light is changed by 10%. Due to the foregoing, even when the output characteristics of the density sensor 31 are fluctuated as shown in FIG. 6, the output voltage $V_{01}$ is provided with the dynamic range of 0.28 V at the minimum, and 1.25 V at the maximum within the range of the amount of light of 100% to 90% as shown in FIG. 16.

In the gain adjustment operation, at first, the gain of the amplifier circuit B2 is set to 2, which is the minimum and then the offset voltage is set to 5 V which is an intermediate value. Here, the exposure lamp is turned ON by the maximum voltage, and an amount of light of 100% is reflected on the reference density section 33 and entered into the density sensor 31.

Figure 17:
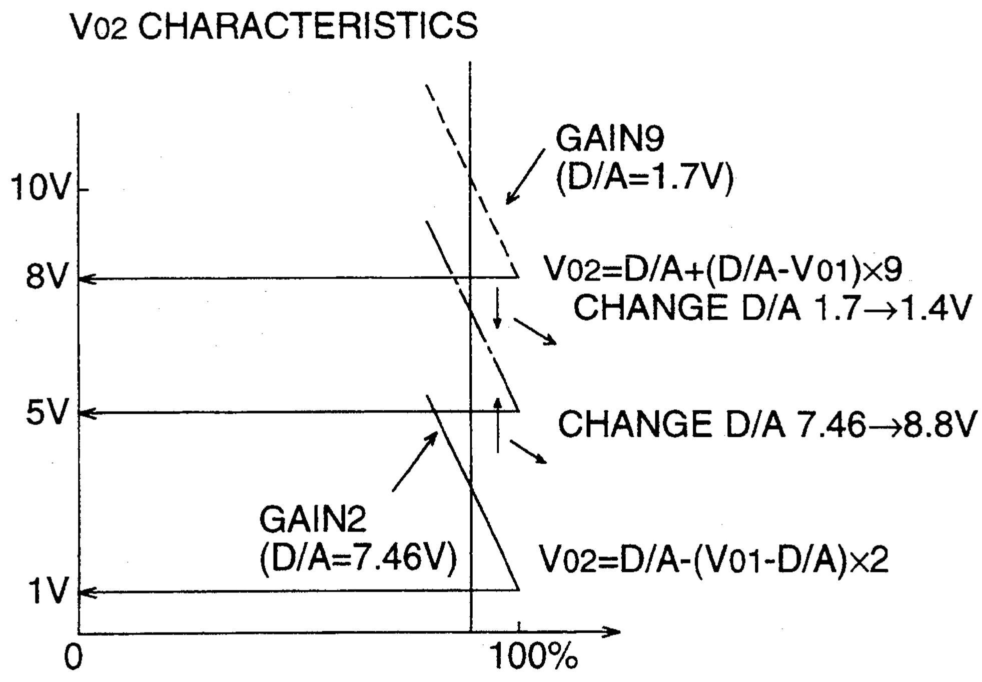
FIG. 17 is a view showing the output characteristics of the amplifier circuit one the mirror smudge detection side.
Figure 18:
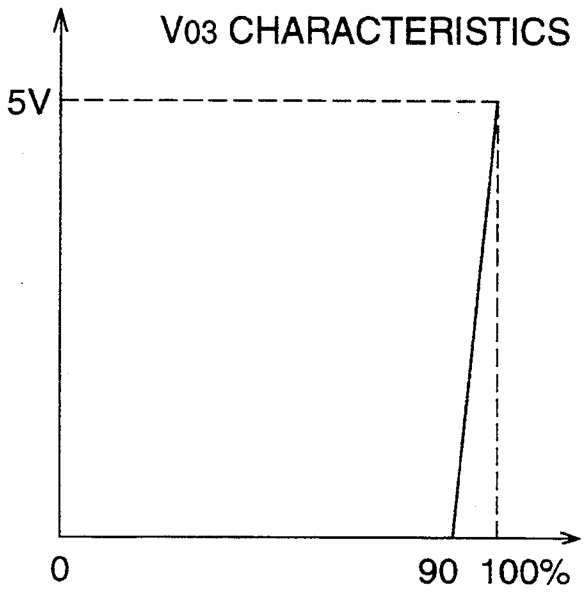
FIG. 18 is a view showing the output characteristics of the amplifier circuit on the mirror smudge detection side.

At this time, a sampling operation is carried out on the output voltage $V_{02}$ outputted from the amplifier circuit B2. When the output voltage $V_{02}$ is within the range of 1 V to 8 V, the output voltage $V_{01}$ at the time is found by calculation. The characteristics of the output voltage $V_{02}$ outputted from the amplifier circuit B2 are shown in FIG. 17.

When the gain of the amplifier circuit B2 is set to 2, and the offset voltage is set to 5 V, the output voltage $V_{02}$ is outputted as $V_{02}=(V_{01}-5)\times 2+5$. Accordingly, the output voltage $V_{01}$ can be calculated from the output voltage $V_{02}$ using the equation: $V=(V+5)/2$ When the output voltage $V_{02}$ is not within the range of 1 V to 8 V, the offset voltage, which is common to amplifier circuits B2 and B3, is changed, and then, when the output voltage $V_{02}$ is within the range of 1 V to 8 V, the output voltage $V_{01}$ under that condition is calculated.

After the output voltage $V_{01}$ has been obtained when the exposure lamp is turned ON (an amount of light of 100%) by the maximum voltage, the gain G is found so that the change of 2.5 V can be obtained as the output voltage $V_{02}$ when the output voltage $V_{01}$ found by the calculation is changed by 10%, where the gain $G=2.5/(V_{01}\times 0.1)$.

That is, it is desired to adjust the gain so that the output voltage $V_{03}$, which is the final output, outputted from the amplifier circuit B3, in which the gain is set to 2, is provided with the characteristics in which the output voltage is changed from 0 V to 5 V, which is the maximum voltage, within the range of the amount of light of 90% to 100%. Accordingly, the amplifier circuit B2 may be adjusted so that the output voltage $V_{02}$ of 2.5 V can be approximately obtained when the input voltage $V_{01}$ is changed by 10%. Therefore, the gain which is necessary for the amplifier circuit B2 is approximately obtained from the equation, the gain $G=2.5/(V_{01}\times 0.1)$.

When the gain G is approximately obtained in the amplifier circuit B2, the adjustment operation is carried out by which the gain in the amplifier circuit B2 is adjusted to coincide with the actually calculated gain G.

Under the foregoing condition, the sampling operation is carried out again on the output voltage $V_{02}$, and it is discriminated whether the output voltage $V_{02}$ is within the range of 1 V to 8 V when an amount of light is 100% at the calculated gain G. Then, the offset voltage in common to the amplifier circuits B2 and B3 is adjusted so that the output voltage $V_{02}$ is within the range of 1 V to 8 V.

As described above, the gain and offset voltage of the amplifier circuit B of the mirror smudge detection system are approximately adjusted, and next, the gain is accurately adjusted.

As described above, after the output ($V_{03}$) at the time of an amount of light of 100% and the output ($V_{03}$) at the time of an amount of light of 90% have been obtained, the gain is adjusted so that the difference between the two outputs is equal to a predetermined voltage (5 V). Then, the sampling operation is carried out again on the data of an amount of light obtained through the amplifier circuit B, and the gain adjustment operation, the switching operation of the amount of light, and the sampling operation on the data of the amount of light are repeated until the aforementioned difference is equal to the predetermined voltage.

Figure 19:
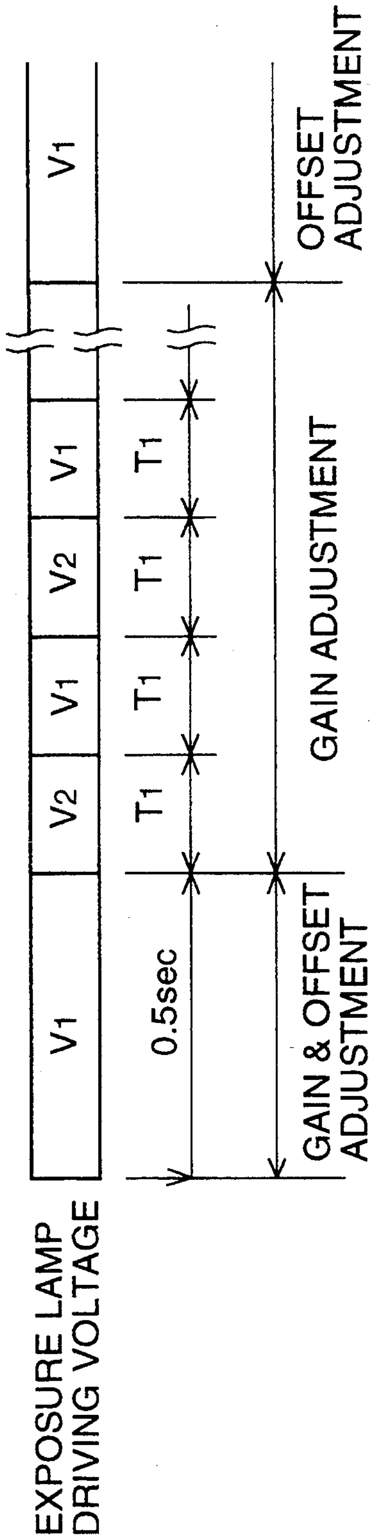
FIG. 19 is a time chart showing a switching operation of a lamp in the adjustment operation on the mirror smudge detection side.

FIG. 19 shows a switching control operation of the exposure lamp. That is, the approximate gain is calculated at first in a predetermined period of time (0.5 sec. in the drawing) as described above, and then, the offset adjusting operation is carried out at this gain so that the output voltage $V_{02}$ is within the range of 1 V to 8 V.

Next, the voltage to be impressed upon the exposure lamp is switched from the maximum voltage $V_1$ to the voltage $V_2$ by which an amount of light, which is lower by 10% than an amount of light obtained when the maximum voltage $V_1$ is impressed, is obtained. Then the sampling operation is conducted on an output which is obtained through the amplifier circuit B at each impressed voltage (each level of an amount of light). When the difference between sampling data is not equal to a predetermined voltage, the gain is changed, the impressed voltage is controlled to be switched again, and the adjustment operation is repeated so as to conduct the sampling operation on the output.

When the condition that an amount of light is lowered by 10% is assumedly made as described above, and the gain adjustment operation, by which the changed amount of the output value at the time is made constant, has been completed, next, the maximum voltage $V_1$ is continuously impressed, the offset adjustment operation is conducted so that the output voltage $V_{02}$ is 5 V, and the gain and offset adjustment operations of the amplifier circuit V are completed.

In this example, although the characteristics of the mirror smudge detection system are set so that the output of the amplifier circuit is changed from the minimum to the maximum within the range of the amount of light of 90% to 100%, and the system has the resolution only within the foregoing range, it is clear that the detection range of an amount of light used for the mirror smudge detection is not limited to the foregoing range. For example, in the case where it is desired to extend the detection range of an amount of light to the range of 80% to 100%, an amount of light of the lamp may be controlled to be switched between 80% and 100% at the time of the adjustment of the amplifier circuit B.

As described above, due to the mirror smudge detecting apparatus for a copier according to the present invention, the mirror smudge can be detected using a document density sensor provided for the automatic density adjustment, and the detection signal outputted from the sensor is processed in an independently provided output processing circuit, so that the mirror smudge can be highly accurately detected.

Further, a level of an amount of light is switched and the light source is turned ON so that the condition that an amount of light is lowered by the mirror smudge is assumedly made, and an output processing circuit of the sensor is adjusted so that an actually detected value is changed by a constant value with respect to a constant decrease of an amount of light. Therefore, an automatic adjustment operation, by which the mirror smudge is highly accurately detected, can be easily conducted, which is advantageous.

What is claimed is:

1. A mirror smudge detecting apparatus for detecting a smudge on a mirror member used in an image forming apparatus, comprising;

means for supporting a document;

a reference density member having a reference density thereon;

means for irradiating said document at said supporting means and said reference density member with a light beam;

means for detecting a reflection of said light beam from said document and said reference density member so that a document density signal, corresponding to a density of said document, and a reference density signal, corresponding to said reference density, are obtained;

the mirror member, located in a path of said light beam between said irradiating means and said detecting means, for reflecting said light beam from said document and said reference density member;

a first output processing circuit for processing said reference density signal to obtain an irradiation controlling signal;

means for controlling said irradiating means according to said irradiation controlling signal; and a second output processing circuit for processing said reference density signal to obtain a mirror smudge detecting signal;

wherein a dynamic range of said second output processing circuit is broader at a high reflection ratio side than a dynamic range of said first output processing circuit.

2. The apparatus of claim 1, further comprising;

means for indicating a mirror smudge according to said mirror smudge detecting signal.

3. The apparatus of claim 1, wherein said controlling means controls said irradiating means according to said mirror smudge detecting signal.

4. The apparatus of claim 1, wherein said controlling means controls said irradiating means so that a light amount of said irradiating means is set at one of a first predetermined light amount and a second predetermined light amount, which is different from said first predetermined light amount; and said controlling means including an adjusting means for adjusting a difference of voltage to activate said irradiating means between a voltage to irradiate said first predetermined light amount and a voltage to irradiate said second predetermined light amount.

* * * * *